United States Patent
Yasui et al.

(10) Patent No.: US 9,789,895 B2
(45) Date of Patent: Oct. 17, 2017

(54) DECORATION ARTICLE HAVING CLEAR LAYER AND METHOD OF FORMING THE SAME

(71) Applicant: TOYODA GOSEI CO., LTD., Kiyosu-shi, Aichi-ken (JP)

(72) Inventors: Kenichiro Yasui, Kiyosu (JP); Kazuya Watakabe, Kiyosu (JP); Takayuki Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 512 days.

(21) Appl. No.: 14/553,058

(22) Filed: Nov. 25, 2014

(65) Prior Publication Data
US 2015/0151775 A1    Jun. 4, 2015

(30) Foreign Application Priority Data
Nov. 29, 2013    (JP) .................................. 2013-248484

(51) Int. Cl.
| | |
|---|---|
| *B62D 1/06* | (2006.01) |
| *B32B 9/02* | (2006.01) |
| *B29C 45/14* | (2006.01) |
| *B29C 67/24* | (2006.01) |
| *B32B 7/12* | (2006.01) |
| *B32B 9/04* | (2006.01) |
| *B32B 1/08* | (2006.01) |
| *B44F 9/02* | (2006.01) |
| *B29K 75/00* | (2006.01) |
| *B29K 705/02* | (2006.01) |
| *B29L 9/00* | (2006.01) |

(Continued)

(52) U.S. Cl.
CPC ............ *B62D 1/06* (2013.01); *B29C 45/1459* (2013.01); *B29C 67/246* (2013.01); *B32B 1/08* (2013.01); *B32B 7/12* (2013.01); *B32B 9/025* (2013.01); *B32B 9/046* (2013.01); *B29K 2075/00* (2013.01); *B29K 2705/02* (2013.01); B29L 2009/00 (2013.01); B29L 2031/3047 (2013.01); *B32B 2266/0278* (2013.01); *B32B 2605/003* (2013.01); *B44C 5/0453* (2013.01); *B44F 9/02* (2013.01); *Y10T 428/1348* (2015.01)

(58) Field of Classification Search
CPC ..... B62D 1/06; B32B 9/025; B32B 2605/003; B32B 7/12; B32B 9/046; B32B 1/08; B32B 2266/0278; B44F 9/02; B29C 45/1459; B29C 67/246; B29K 2075/00; B29K 2705/02; B29L 2009/00; B29L 2031/3047; Y10T 428/1348; B44C 5/0453
See application file for complete search history.

(56) References Cited

FOREIGN PATENT DOCUMENTS

| JP | 2013-018336 A | 1/2013 |
|---|---|---|
| JP | 2013-018458 A | 1/2013 |

*Primary Examiner* — Michael C Miggins
(74) *Attorney, Agent, or Firm* — Posz Law Group, PLC

(57) ABSTRACT

A decoration article having a clear layer includes a rod-shaped core material, a cylindrical decorative cover having a shape retaining property, configured to cover the core material over an entire circumference in a sectional circumferential direction of the core material, including a plurality of split members split along the sectional circumferential direction of the core material and having a base part and a decoration layer provided on a surface of the base part, and a transparent clear layer formed by a mold forming so as to cover an outer surface of the decoration layer over an entire circumference in a sectional circumferential direction of the decoration cover covering the core material.

8 Claims, 17 Drawing Sheets

(51) Int. Cl.
*B29L 31/30* (2006.01)
*B44C 5/04* (2006.01)

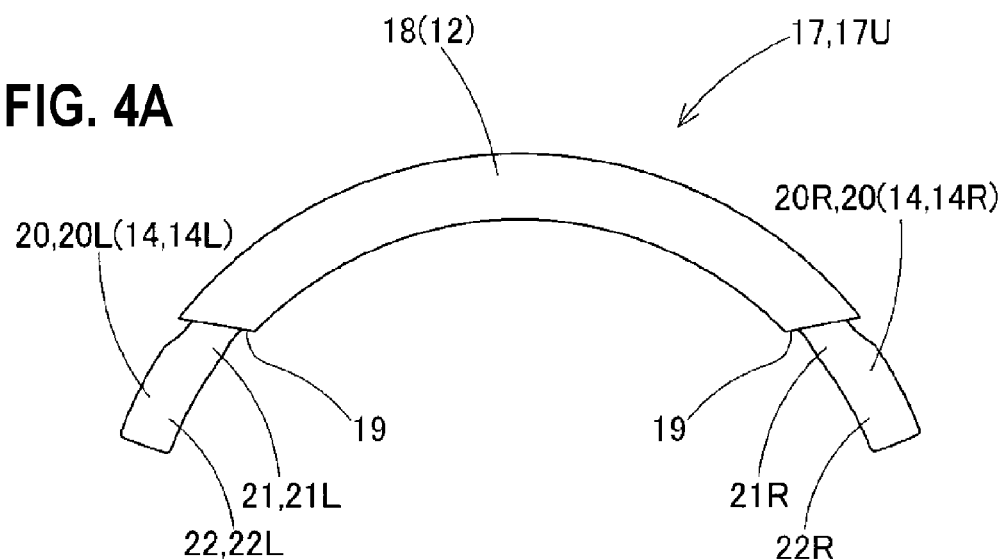
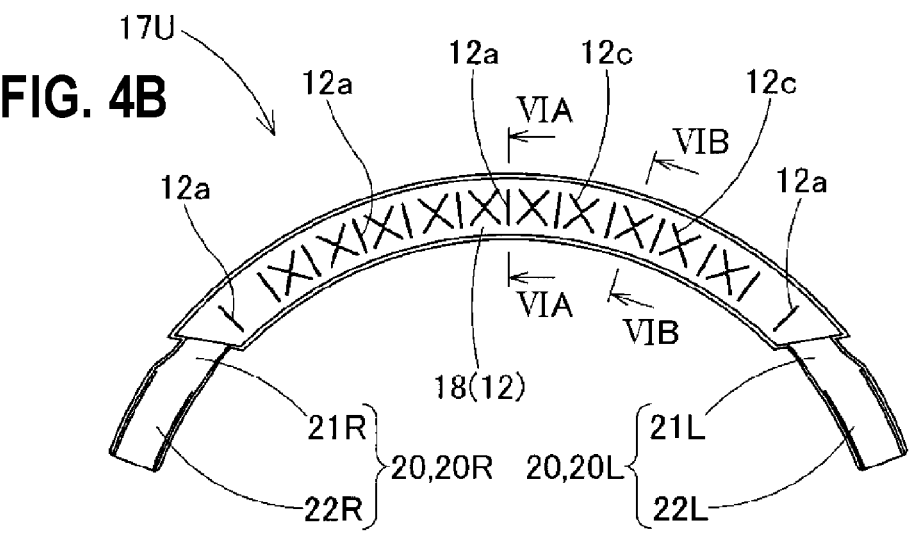

VIA-VIA

VIB-VIB

VIC-VIC

D. VID-VID

*# DECORATION ARTICLE HAVING CLEAR LAYER AND METHOD OF FORMING THE SAME

CROSS-REFERENCE TO RELATED APPLICATIONS

This application claims the benefit of Japanese Patent Application No. 2013-248484 (filed on Nov. 29, 2013), the entire contents of which are incorporated by reference herein.

BACKGROUND

1. Technical Field

The present invention relates to a decoration article having a clear layer, such as a vehicular leather-wrapped steering wheel having a clear layer provided on a wood design section of a ring part gripped upon steering, and a method of forming the same.

2. Related Art

Regarding a decoration article of the above type, for example, a leather steering wheel, a ring part gripped upon steering is configured by arranging a decorative cover and a cover member having a leather part along a circumferential direction of a plane around a core material made of aluminum alloy and the like (for example, refer to Patent Documents 1 and 2). The decorative cover is configured by providing a wood design on a decoration layer of an outer surface-side, is made of a wooden material or is configured by bonding a sheet material having a wood design to a surface of a base material consisting of a rigid synthetic resin material. Also, the decorative cover consists of a split member configured to split into a plurality of (two) members (upper and lower) along a sectional circumferential direction of the ring part.

[Patent Document 1] JP-A-2013-018336A
[Patent Document 2] JP-A-2013-018458A

In a steering wheel of the related art, it is necessary to provide a clear layer on an outer surface of the decorative cover so as to make the decorative cover glossy and to improve the design characteristic. At this time, it may be considered a method of providing a clear layer by a mold forming so as to form a constant film thickness on the outer surface of the decorative cover without taking much labor, as compared to a dip method, a spraying method and the like requiring a masking and the like. However, according to this configuration, a molding material of the clear layer is introduced to a backside of the decorative cover in the configuration of the related art, so that a pressure of the molding material is lowered and air bubbles are generated in the clear layer to cause a defect in an outward appearance.

Regarding the above problems, a terminal of the decorative cover may be filled with an adhesive or may be provided with a separate piece (refer to Patent Document 2) so as to block an introduction hole through which the molding material of the clear layer is introduced. In this case, however, a separate process for performing the same is required, so that it is difficult to simply manufacture a decoration article such as a leather steering wheel having a good outward appearance in which the generation of air bubbles is suppressed.

It is therefore an object of the present invention to provide a decoration article having a clear layer, which can be conveniently and cleanly formed, and a forming method thereof.

SUMMARY (1) According to an aspect of the invention, a decoration article having a clear layer includes:

a rod-shaped core material;

a cylindrical decorative cover having a shape retaining property, configured to cover the core material over an entire circumference in a sectional circumferential direction of the core material, including a plurality of split members split along the sectional circumferential direction of the core material and having a base part and a decoration layer provided on a surface of the base part, and a transparent clear layer formed by a mold forming so as to cover an outer surface of the decoration layer over an entire circumference in a sectional circumferential direction of the decoration cover covering the core material.

The base part of the decorative cover includes a large diameter part having the decoration layer and covered with the clear layer, step parts configured to come closer to the core material from both ends of the large diameter part than the large diameter part, and small diameter parts extending from inner periphery edges of the step parts so as to be separate from the large diameter part, the respective split members are configured to form a mutually continuing cylindrical shape body around the core material when the split members are arranged around the core material, the clear layer is arranged to leave exposed parts over entire circumferences of both terminals of the small diameter parts and to cover an outer periphery ranging from the large diameter part including the decoration layer to the small diameter parts via the step parts, and a cover member adjacent to the decoration layer and configured to cover the small diameter parts is arranged at both ends of the decorative cover.

According to the decoration article of the present invention, when the split members configuring the decorative cover are arranged to cover the core material in the sectional circumferential direction of the core material, the split members form a cylindrical shape body around the core material. Therefore, an edge of the exposed part of the small diameter part becomes a parting portion and the exposed part becomes a support part of a clear layer molding tool, so that the decorative cover can be set in a cavity of the clear layer molding tool with good precision as regards an arrangement position. Also, in the cavity of the molding tool, a part ranging from the large diameter part of the decorative cover to the small diameter parts via the step parts forms the cylindrical shape body continuing in the sectional circumferential direction of the core material. Therefore, there is no gap through which a molding material of the clear layer is introduced to the core material-side and a molding pressure is not lowered upon the molding, so that an air bubble is not generated and the clear layer can be cleanly formed.

Since the exposed parts are covered by the cover member, the design characteristic of the decoration article is not deteriorated even when the clear layer is not provided.

Since the clear layer can be formed by a mold forming, which is different from a dip method and a spraying method requiring a masking and does not require a troublesome operation of performing the masking and detaching a masking material, it is possible to make a film thickness uniform without taking much labor. Therefore, it is possible to form a clean decoration part of a high quality.

Therefore, in the decoration article having the clear layer according to the present invention, it is possible to form the clear layer conveniently and cleanly by using the step parts and the small diameter parts continuing from the large diameter part of the decorative cover.

(2) In the decoration article of the configuration (1), a spacer configured to support the decorative cover with contacting the core material and the decorative cover is arranged between the large diameter part of the decorative cover and the core material.

According to the above configuration (2), even when the large diameter part of the decorative cover is arranged with being separate from an outer periphery of the core material of the decoration article, the large diameter part can be supported to the core material with the spacer being interposed therebetween. Therefore, it is possible to prevent the positional deviation (shaking) or depression of the decorative cover (the large diameter part) with respect to the core material.

(3) In the decoration article of the configuration (1) or (2), the core material is a core material having a continuous circular-ring shape configured as a rod shape of a ring part gripped upon steering of a vehicular steering wheel, the ring part is arranged with the decorative cover having the decoration layer as a wood design and the cover member having a leather part provided on an outer surface thereof, in a circumferential direction of a plane thereof, and the decoration article is configured as a leather-wrapped steering wheel.

(4) In the decoration article of the configuration (3), extension parts including a support part configured to support an end portion of the leather part and a fitting recess arranged between the support part and the large diameter part and configured to fit a terminal of the leather part therein are formed on outer surfaces of the small diameter parts of the decorative cover so as to extend a molding material of the clear layer by a mold forming.

According to the above configurations (3) and (4), since it is possible to cleanly fit the terminal of the leather part in the fitting recess, it is possible to cleanly finish the terminal of the leather part. Also, since it is possible to form the extension part at the same time upon the forming of the clear layer, it is different from a configuration of separately mounting the extension part around the core material and it is possible to conveniently manufacture the leather-wrapped steering wheel.

(5) According to another aspect of the invention, a method of forming a decoration article having a clear layer, the decoration article includes:

a rod-shaped core material;

a cylindrical decorative cover having a shape retaining property, configured to cover the core material over an entire circumference in a sectional circumferential direction of the core material, including a plurality of split members split along the sectional circumferential direction of the core material and having a base part and a decoration layer provided on a surface of the base part, and a transparent clear layer formed by a mold forming so as to cover an outer surface of the decoration layer over an entire circumference in a sectional circumferential direction of the decoration cover covering the core material wherein the base part of the decorative cover including a large diameter part having the decoration layer and covered with the clear layer, step parts configured to come closer to the core material from both ends of the large diameter part than the large diameter part, and small diameter parts extending from inner periphery edges of the step parts so as to be separate from the large diameter part, wherein the respective split members are configured to form a mutually continuing cylindrical shape body around the core material when the split members are arranged around the core material, wherein the clear layer is arranged to leave exposed parts over entire circumferences of both terminals of the small diameter parts and to cover an outer periphery ranging from the large diameter part including the decoration layer to the small diameter parts via the step parts, and wherein a cover member adjacent to the decoration layer and configured to cover the small diameter parts is arranged at both ends of the decorative cover, the method comprising:

arranging the respective split members of the decorative cover around the core material, setting the core material having the split members arranged thereto in an opened clear layer molding tool by using the exposed parts of the small diameter parts as a support part, and closing the tool to form the clear layer.

According to the forming method (5) of the present invention, when the split members are arranged around the core material to thus form the cylindrical decorative cover, it is possible to set the decorative cover in the opened clear layer molding tool by using the exposed parts of the small diameter parts of the decorative cover as the support part. Therefore, it is possible to arrange the decorative cover covering the core material in a cavity with good positional precision and to form the clear layer with the uniform thickness even when the clear layer to be formed is made to be thin.

Since the clear layer is formed on an outer periphery of the cylindrical shape body having no introduction hole capable of securing the air tightness, i.e., the continuous cylindrical shape body around the core material from the large diameter part including the decoration layer to the exposed parts of the small diameter parts via the step parts, it is possible to prevent the molding material from being introduced to the core material-side to lower the molding pressure, and to form the clear layer conveniently and cleanly by the mold forming without generating the air bubbles.

(6) The method of (5) further includes setting a spacer in the clear layer molding tool, the spacer made of synthetic resin, configured to support the decorative cover with contacting the core material and the decorative cover and arranged between the large diameter part of the decorative cover and the core material. The spacer is formed around the core material by a mold forming.

According to the above configuration, it is possible to easily arrange the space capable of preventing the positional deviation (shaking) or depression of the decorative cover (large diameter part) with respect to the core material around the core material, as compared to a configuration of separately mounting the space to the core material.

(7) In the method of (5) and (6), the core material is a core material having a continuous circular-ring shape configured as a rod shape of a ring part gripped upon steering of a vehicular steering wheel, the ring part is arranged with the decorative cover having the decoration layer as a wood design and the cover member having a leather part provided on an outer surface thereof, in a circumferential direction of a plane thereof, and the decoration article is configured as a leather-wrapped steering wheel.

In this case, as described above, it is possible to cleanly form the clear layer, which is configured to cover the decoration layer of the decorative layer, with the uniform thin thickness without generating the air bubbles.

(8) The method of (7) further includes forming extension parts together with the clear layer upon the forming of the clear layer molding tool, the extension parts including a support part configured to support an end portion of the leather part and a fitting recess arranged between the support part and the large diameter part and configured to fit a terminal of the leather part therein are formed on outer surfaces of the small diameter parts of the decorative cover so as to extend a molding material of the clear layer by a mold forming.

According to the above configuration, it is possible to form the extension part having the support part and the fitting recess for finishing the terminal of the leather part at the same time upon the forming of the clear layer. Therefore, it is possible to arrange the extension part at a defined position without labor and easily, which can contribute to a reduction in the number of manufacturing processes of the leather-wrapped steering wheel.

BRIEF DESCRIPTION OF THE DRAWINGS

FIGS. 4A and 4B are a plan view and a bottom view of an upper split member used for the steering wheel of the illustrative embodiment.

DETAILED DESCRIPTION

Figure 1:
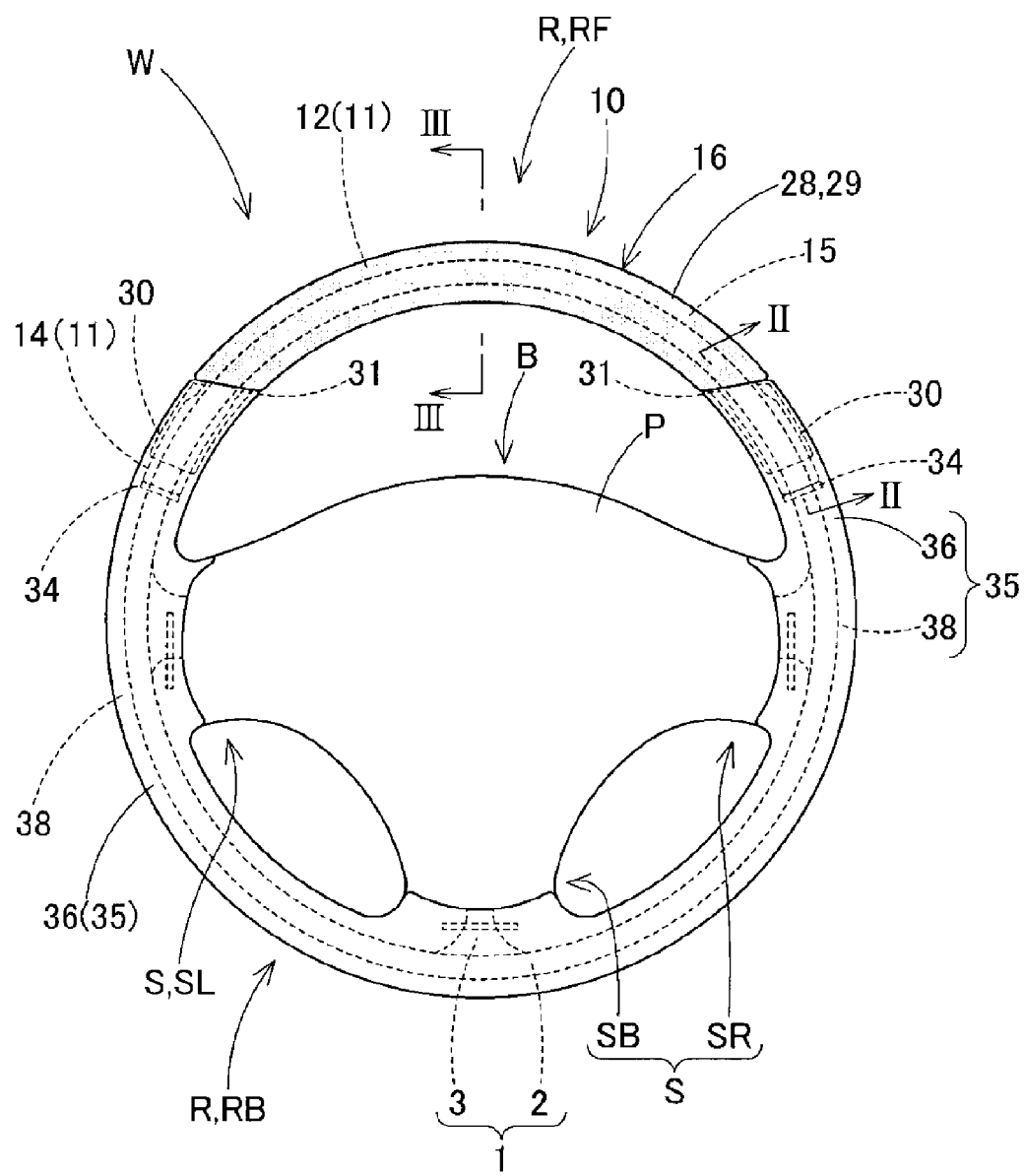
FIG. 1 is a plan view of a leather steering wheel, which is an example of a decoration article according to an illustrative embodiment of the present invention.
Figure 2:
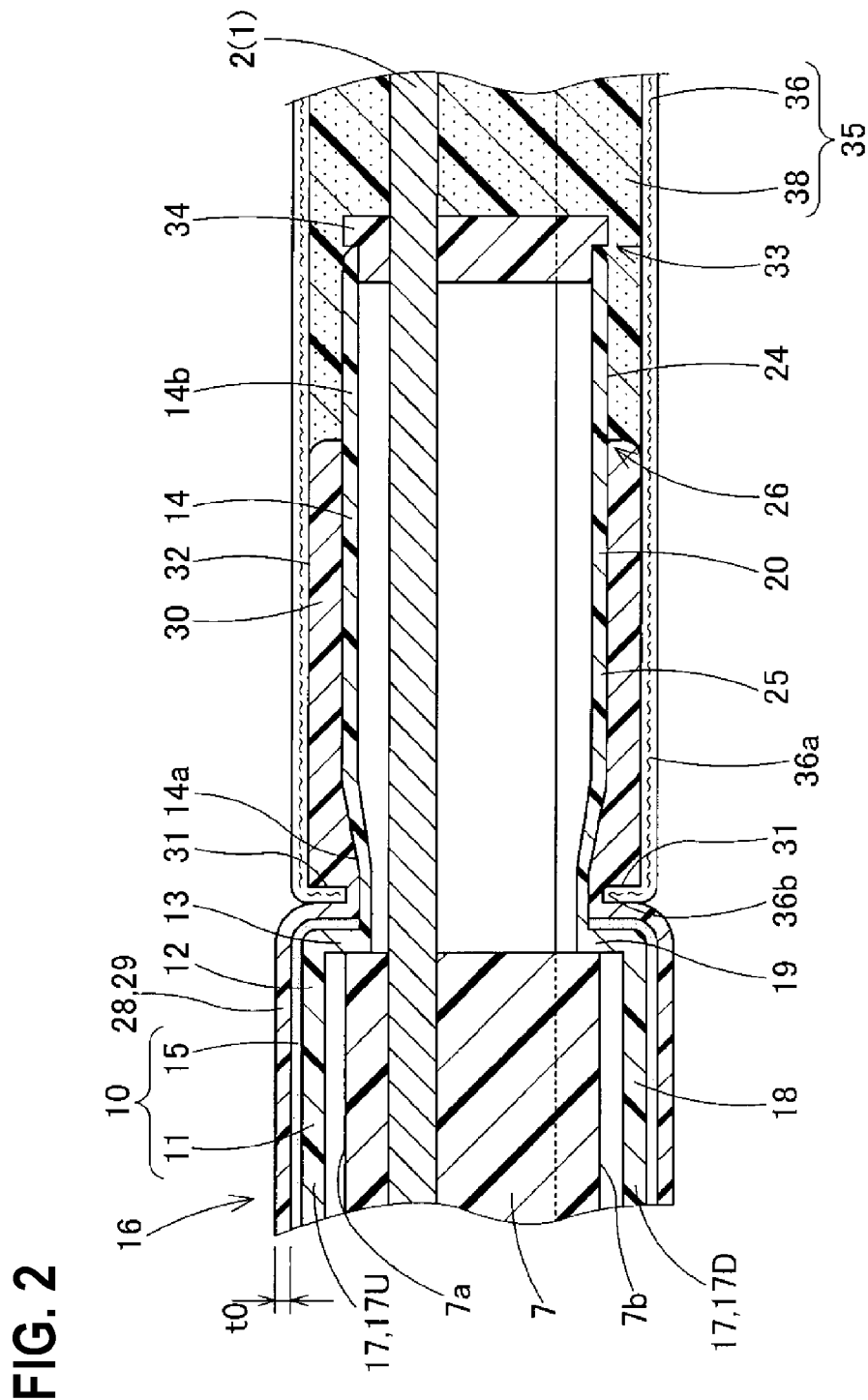
FIG. 2 is a schematic longitudinally sectional view taken along a line II-II of FIG. 1.
Figure 3:
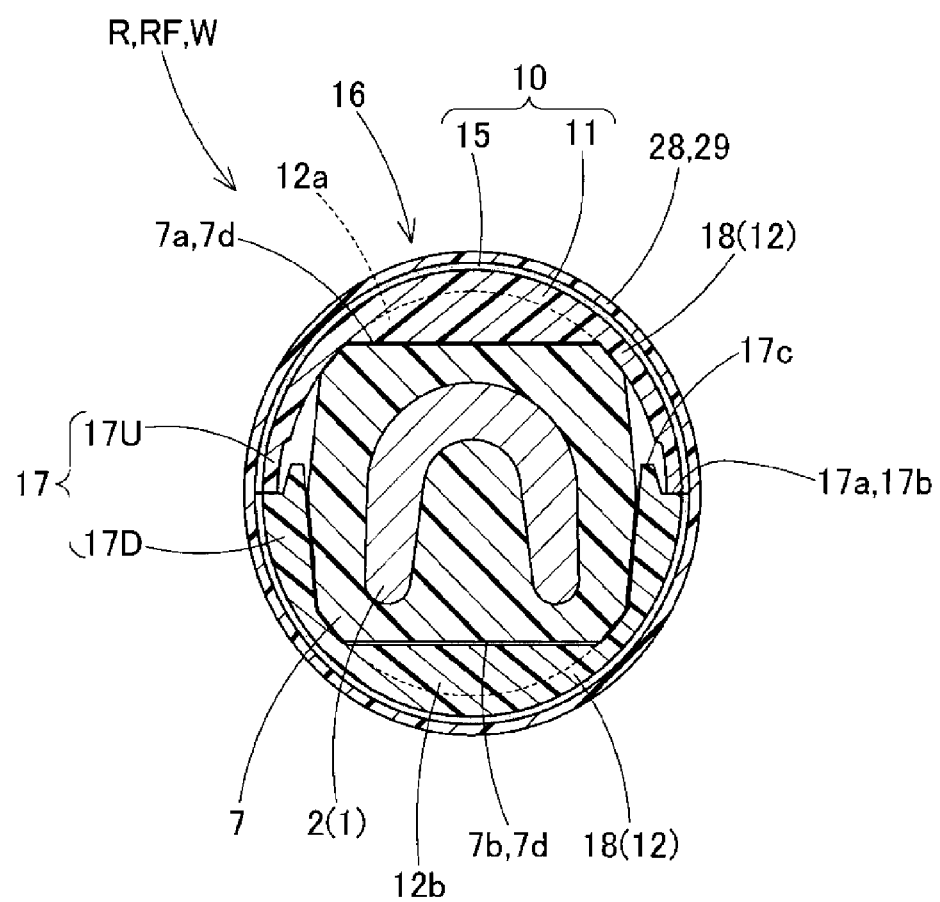
FIG. 3 is a schematic longitudinally sectional view taken along a line III-III of FIG. 1.
Figure 5A:
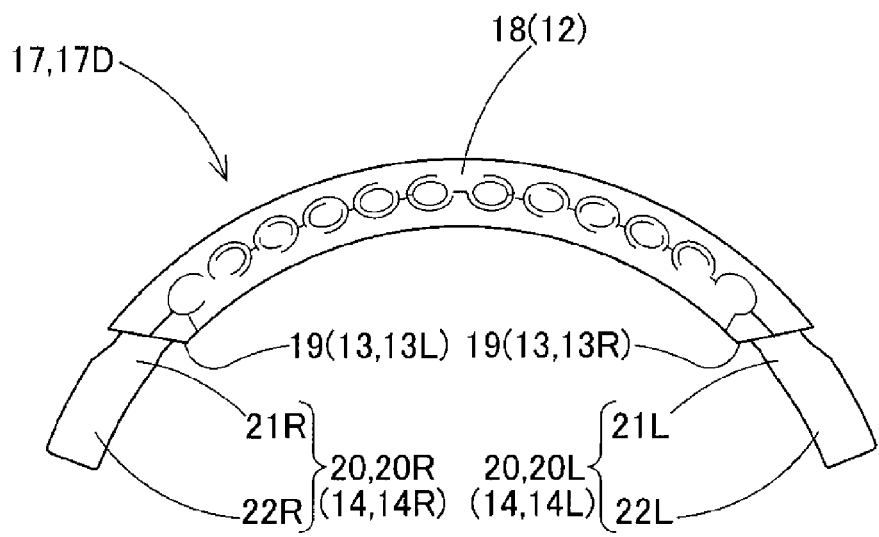
FIGS. 5A and 5B are a plan view and a bottom view of a lower split member used for the steering wheel of the illustrative embodiment.
Figure 5B:
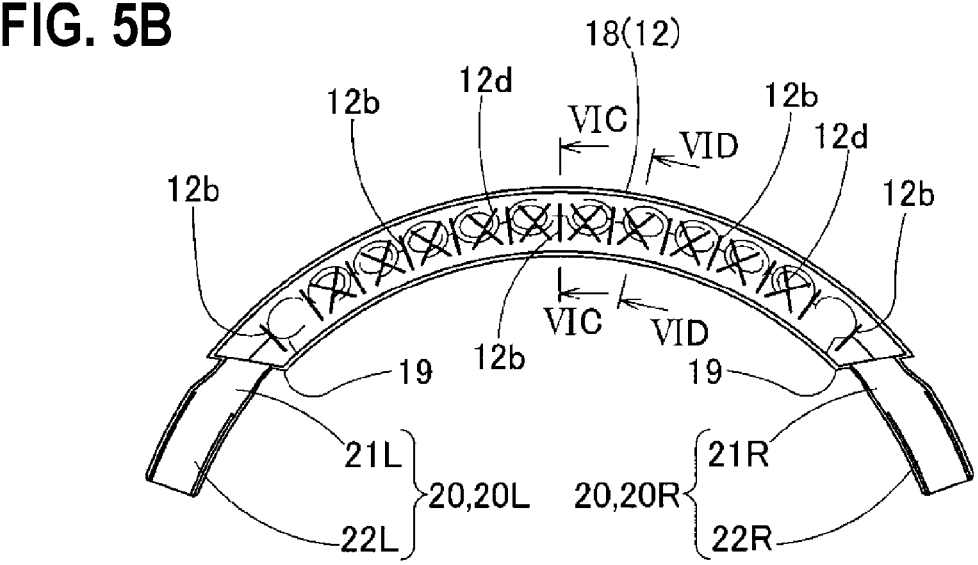
Figure 6A:
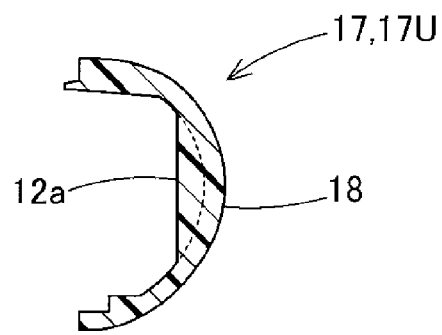
FIGS. 6A to 6D are sectional views of the upper and lower split members taken along a line VIA-VIA of FIG. 4, a line VIB-VIB of FIG. 4, a line VIC-VIC of FIG. 5 and a line VID-VID of FIG. 5, respectively.
Figure 6B:
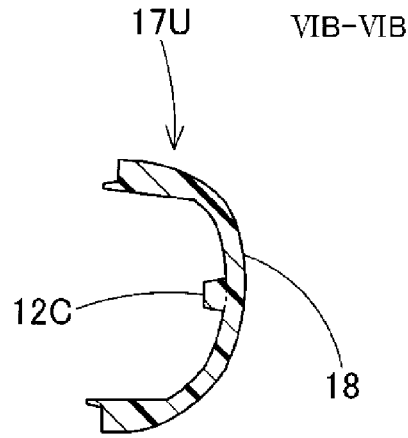
Figure 6C:
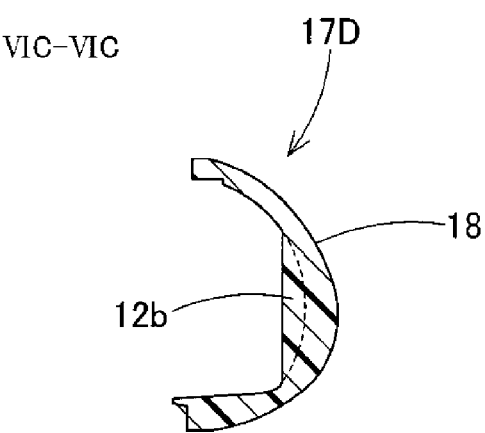
Figure 6D:
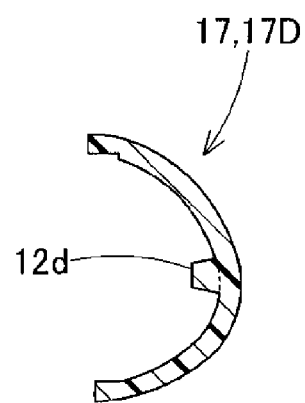

Hereinafter, an illustrative embodiment of the present invention will be described with reference to the drawings. As shown in FIGS. 1 to 3, a decoration article manufactured according to the illustrative embodiment is a leather-wrapped steering wheel W. The steering wheel W has a circular ring-shaped ring part R gripped upon steering, a boss part B arranged at a center of the ring part R and three spoke parts S configured to connect the ring part R and the boss part B, and a steering wheel core bar 1 is arranged therein.

Also, a pad P is arranged on an upper surface of the boss part B of the steering wheel W so as to come close to a cover member 35 having a leather part 36 of each spoke part S.

The leather part 36 of the cover member 35 is arranged over portions of the respective spoke parts S in the vicinity of the ring part R and a rear part RB of the ring part R ranging from vicinities of both left and right spoke parts SL, SR to a rear spoke part SB, and a decorative cover 10 in which a decoration layer 15 having a wood design is expressed on an outer surface thereof is arranged at a front part RD of the ring part R, as shown in FIGS. 1 to 3. In other words, an outward appearance of the ring part R is bisected into the leather part 36 of the cover member 35 and the decoration layer 15 of the decorative cover 10 covered by a decoration main body part 29 of a clear layer 28.

In the meantime, the leather part 36 of the cover member 35 is made of natural leather or synthetic leather and is wound on an outer surface of a covering layer 38, which consists of a soft foamed urethane and the like formed around a ring core bar part 2 (which will be described later) of the core bar 1, by using an adhesive, and terminals 36b of left and right end portions 36a of a front end-side of the leather part 36 are fitted and arranged into fitting recesses 31 provided at extension parts 30 (which will be described later) by using the adhesive.

Figure 7:
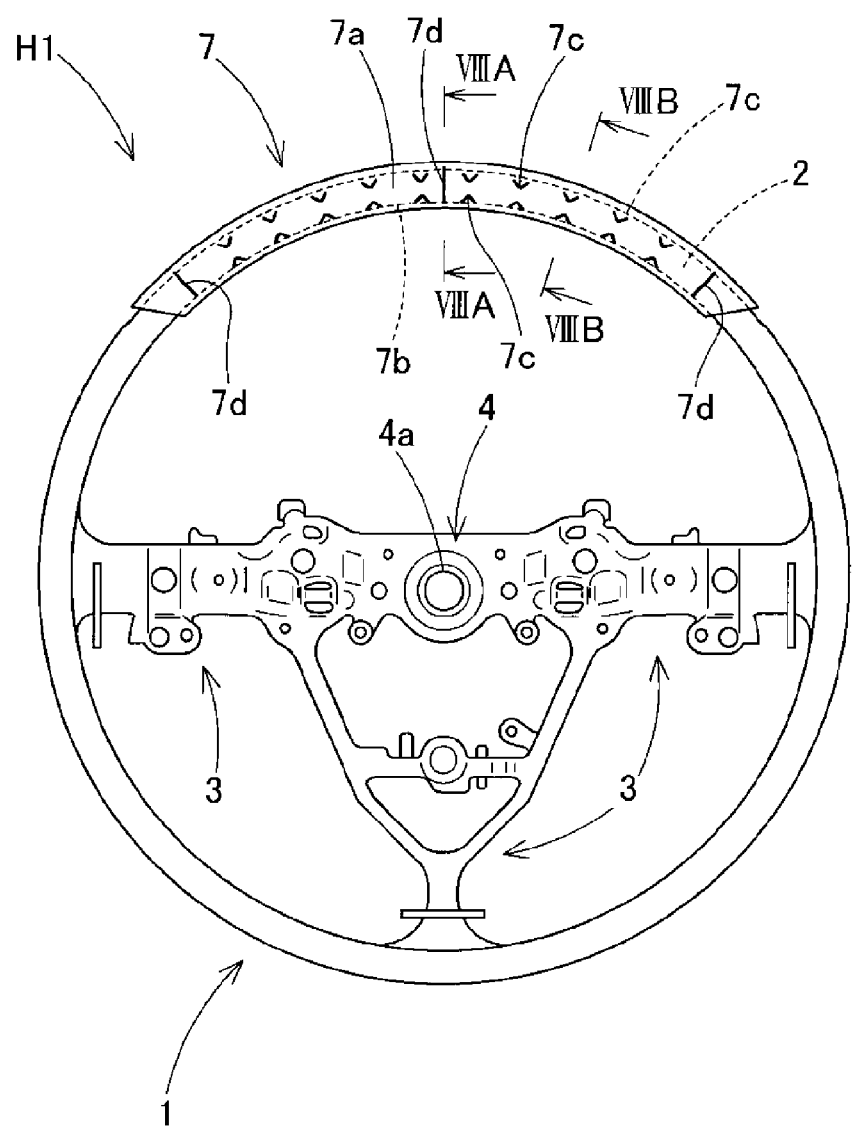
FIG. 7 is a plan view illustrating a first steering wheel before completion at a state where a spacer is formed on a steering wheel core bar of the illustrative embodiment.
Figure 8A:
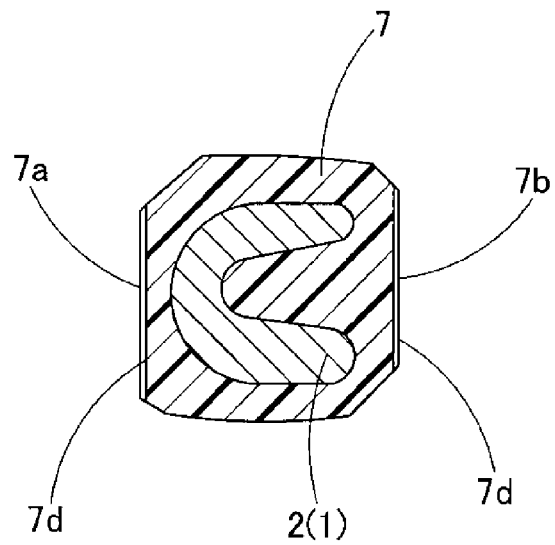
FIGS. 8A and 8B are sectional views of the first steering wheel before completion taken along a line VIIIA-VIIIA and a line VIIIB-VIIIB of FIG. 7.
Figure 8B:
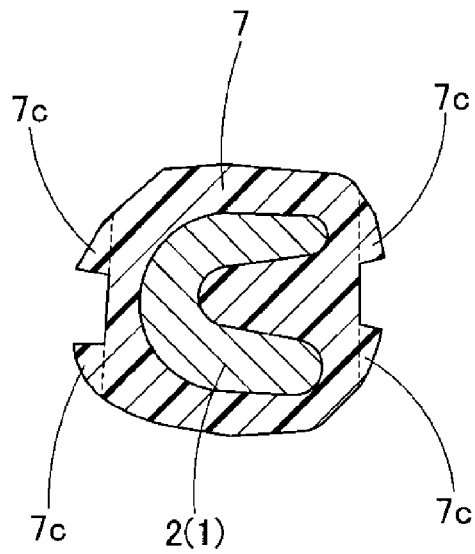

As shown in FIG. 7, the steering wheel core bar 1 has a ring core bar part 2 continuing in a circular ring shape as a rod shape arranged at the ring part R, a boss core bar part 4 arranged at the central boss part B and spoke core bar parts 3 arranged at the spoke parts S configured to connect the ring core bar part 2 and the boss core bar part 4, and a boss 4a becoming a connection part with a steering shaft (not shown) is arranged at a center of the boss core bar part 4. The steering wheel core bar 1 is made of a die cast material consisting of a light alloy material such as aluminum, except for the boss 4a made of steel, and the ring core bar part 2 has a reverse U-shaped section (refer to FIG. 3).

Also, as shown in FIGS. 2, 3, 7 and 8, a spacer 7 made of rigid synthetic resin such as polypropylene is formed around the ring core bar part 2 in the front part RF of the ring part R. The spacer 7 is formed by setting and clamping the core bar 1 to an opened molding tool 40 (refer to FIG. 9) for injection molding configured to form the spacer 7 and then injecting a molding material M1 of the spacer 7 into a cavity 40a from a gate 40b.

Figure 9:
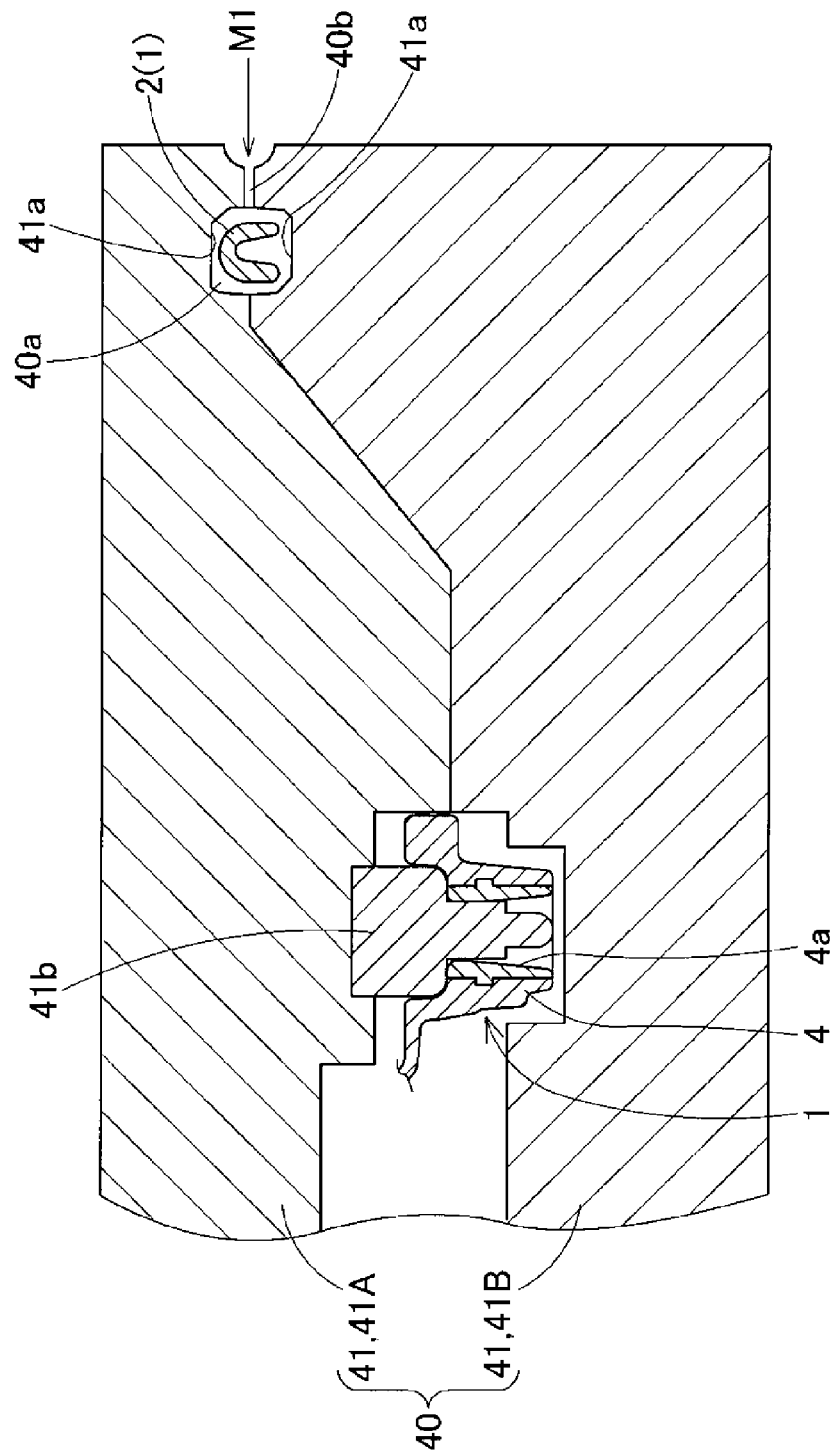
FIG. 9 is a schematic longitudinally sectional view illustrating a state where the steering wheel core bar is set and clamped to a molding tool configured to form the space of the illustrative embodiment.

As shown in FIG. 9, the molding tool 40 has split molds 41 (41A, 41B). The split molds 41A, 41B have mold surfaces 41a for a cavity configured to form a cavity 40a upon mold clamping. Also, the split mold 41A is provided with a set pin 41b with which the boss 4a is fitted.

In the meantime, a molded article in which the steering wheel core bar 1 is formed with the spacer 7 is a first steering wheel H1 before completion.

As shown in FIGS. 2, 3, 7 and 8, the spacer 7 is arranged in an inner periphery-side area of a large diameter part 12 (which will be described later) of the decorative cover 10, has a substantially quadrilateral section, is provided with triangular prism-shaped projections 7c at an inner edge and an outer edge of an upper surface 7a and a lower surface 7b thereof, and is provided with linear concave recesses 7d extending radially from the boss 4a. The upper surface 7a and the lower surface 7b are flat planes.

Figure 10:
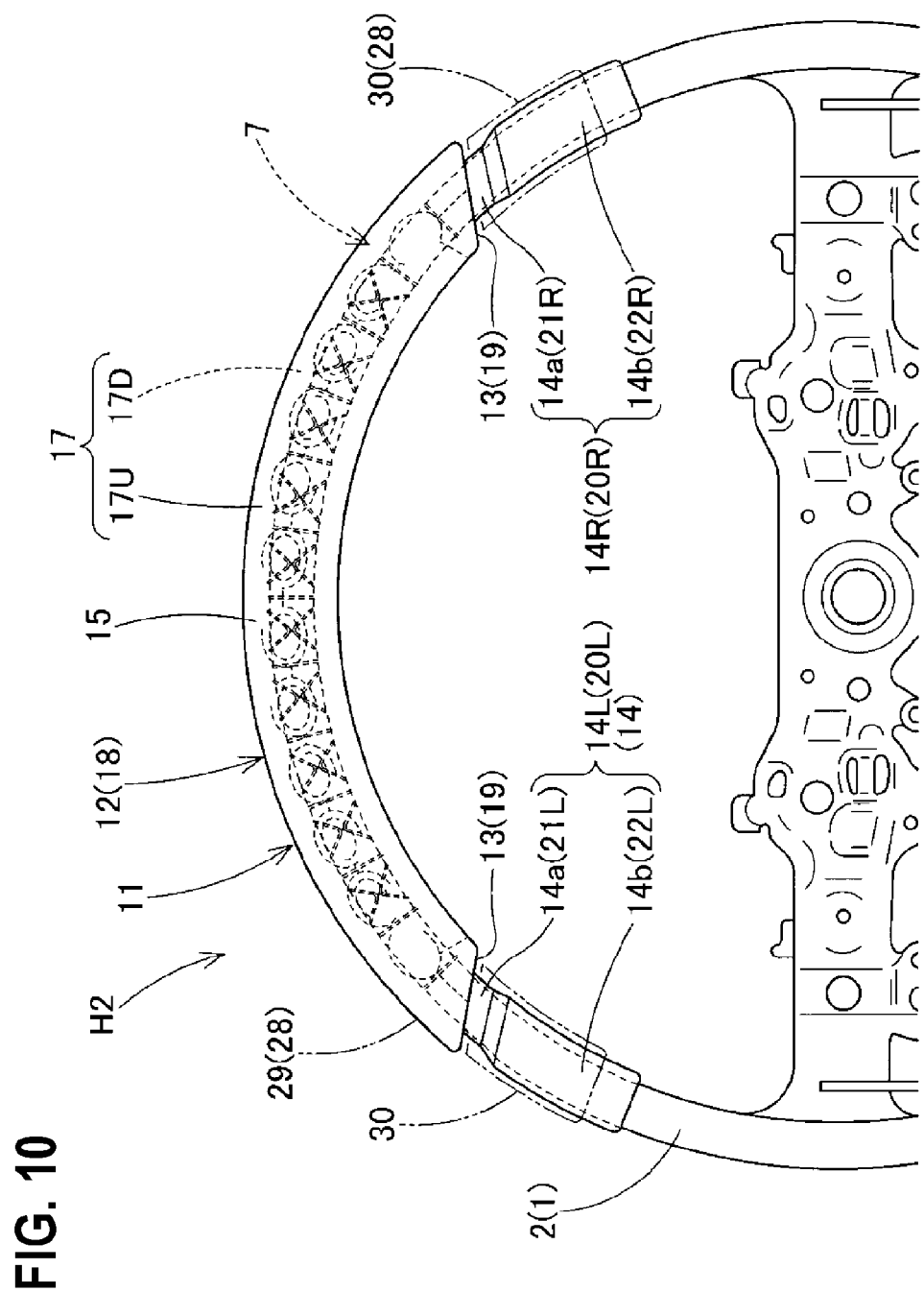
FIG. 10 is a partial plan view illustrating a second steering wheel before completion at a state where a split member is arranged at the steering wheel core bar having the spacer formed thereto of the illustrative embodiment.

As shown in FIGS. 2, 3 and 10, the decorative cover 10 has a base part 11 consisting of a rigid synthetic resin material such as PC/ABS alloy and the like having a shape retaining property, and a decoration layer 15 consisting of a sheet material provided on a surface of the base part 11 and expressing the wood design.

The base part 11 has the bent tube-shaped large diameter part 12 having the decoration layer 15 provided on the outer surface thereof and having a substantially circular ring-shaped section, step parts 13 (13L, 13R) arranged at both ends of the large diameter part 12 and configured to come close to the ring core bar part 2 from the large diameter part 12, and bent tube-shaped small diameter parts 14 (14L, 14R) extending from inner periphery edges of the step parts 13L, 13R so as to be separate from the large diameter part 12, having a diameter smaller than the large diameter part 12 and having a substantially circular ring section. The small diameter parts 14L, 14R have cylindrical bent tube parts 14b bent to have the same outer diameter size at terminals thereof, and annular recesses 14a depressed from the bent tube parts 14b are arranged at the step parts 13L, 13R-side. The decoration layer 15 is arranged on an outer periphery of the large diameter part 12.

As shown in FIGS. 3 and 4 to 6, the decorative cover 10 has a plurality of split members 17 (17U, 17D) (two upper and lower split members, in this illustrative embodiment) split along a sectional circumferential direction of the ring core bar part 2. That is, in this illustrative embodiment, the split members 17U, 17D are arranged to cover an entire circumference of the ring core bar part 2 covered with the spacer 7 in the sectional circumferential direction.

Each of the split members 17U, 17D has a large diameter configuration part 18 configuring the large diameter part 12 having the decoration layer 15, connection wall parts 19 configuring the step parts 13 and small diameter configuration parts 20 (20L, 20R) configuring the small diameter parts 14 (14L, 14R). The split members 17U, 17D are configured to form the cylindrical decorative cover 10 continuing around the ring core bar part 2 when arranging the same around the ring core bar part 2.

Specifically, mating surfaces 17a, 17b of the upper and lower split members 17U, 17D are formed along a circumferential direction of a plane of the ring part R (along a direction orthogonal to a shaft center of the boss 4a). The mating surfaces 17a of the upper split member 17U having a reverse U-shaped section are arranged at both end portion surfaces of the section. The mating surfaces 17b of the lower split member 17D having a U-shaped section are planes configured to mate in parallel with the mating surfaces 17a and are provided on inner peripheries thereof with projections 17c. The mating surfaces 17a, 17b are also configured in the same manner for the large diameter configuration part 18 and the small diameter configuration parts 20, although the magnitudes thereof are different (refer to FIGS. 12 and 14). The cylindrical decorative cover 10 is configured to have air tightness capable of coping with a molding pressure (about 1.5 MPa) of the clear layer 28 when the split members 17U, 17D are arranged around the ring core bar part 2 and are set and clamped to a clear layer molding tool 45 (at this time, exposed parts 24 (which will be described later) are interposed between split molds 46A, 46B of the molding tool 45) (refer to FIGS. 13B and 14B) while the mating surfaces 17a, 17b are mated and bonded to each other by using an adhesive.

Also, the small diameter configuration parts 20L, 20R have recess portions 21 (21L, 21R) configuring the annular recesses 14a and splitting surface parts 22 (22L, 22R) configuring the bent tube parts 14b. Terminals of the splitting surface parts 22L, 22R become exposed parts (non-covered parts) 24 (24L, 24R) for which the clear layer 28 is not provided, and the recess portions 21L, 21R of the splitting surface parts 22L, 22R become covered parts 25 covered by a molding material M2 for forming the clear layer 28. In the meantime, as described above, the exposed parts 24 (24L, 24R) become support parts of the split molds 46 when clamping the molding tool 45.

In the illustrative embodiment, ribs 12a, 12b arranged in a radially straight line shape from the boss 4a and cross-shaped ribs 12c, 12d are arranged on the inner periphery of the large diameter part 12 of the decorative cover 10. The ribs 12a, 12c are arranged at the split member 17U so as to contact the upper surface 7a of the spacer 7, and the ribs 12b, 12d are arranged at the split member 17D so as to contact the lower surface 7b of the spacer 7. The ribs 12a, 12b, 12c, 12d are not necessarily required to contact the upper surface 7a and lower surface 7b of the spacer all the time with being pressed. That is, the ribs 12a, 12b, 12c, 12d are arranged to prevent the decorative cover 10 from deviating with respect to the ring core bar part 2 or from being depressed when the decorative cover 10 is strongly pressed.

In the meantime, when seeing the ring part R from above, the straight line-shaped ribs 12a, 12b are arranged between the projections 7c along the circumferential direction of the plane of the ring part R, and the cross-shaped ribs 12c, 12d are arranged so that the central intersection points of the cross shape are arranged at the projections 7c, 7c on the inner and outer edges of the spacer 7 along the radial direction of the boss 4a. The ribs 12a, 12b arranged at the positions corresponding to the concave recesses 7d of the spacer 7 are formed to be higher than the others so that they can be inserted into the concave recesses 7d.

Also, an article having the decorative cover 10 obtained by bonding the split members 17U, 17D having the decoration layer 15 bonded around the ring core bar part 2, including the periphery of the spacer 7, is a second steering wheel H2 before completion.

The clear layer 28 is formed by a mold forming using transparent urethane, by a reaction injection molding, in this illustrative embodiment. The clear layer 28 has a decoration main body part 29 and extension parts 30, 30 at both left and right ends, and is arranged to cover the outer periphery ranging from the large diameter part 12 including the decoration layer 15 to covered parts 25L, 25R of the small diameter parts 14L, 14R while leaving the exposed parts 24L, 24R over the entire circumference of the terminals of the small diameter parts 14 (14L, 14R). The decoration main body part 29 is configured to cover the outer surface of the decoration layer 15 so that the decoration layer 15 of the decorative cover 10 is glossy. The extension parts 30, 30 are formed on the outer surfaces of the small diameter parts 14L, 14R of the decorative cover 10. The extension part 30 has a cylindrical support part 32 configured to support an end portion 36a of the leather part 36 and a fitting recess 31 arranged between the support part 32 and the large diameter part 12 and configured to fit a terminal 36b of the leather part 36 therein.

Figure 12:
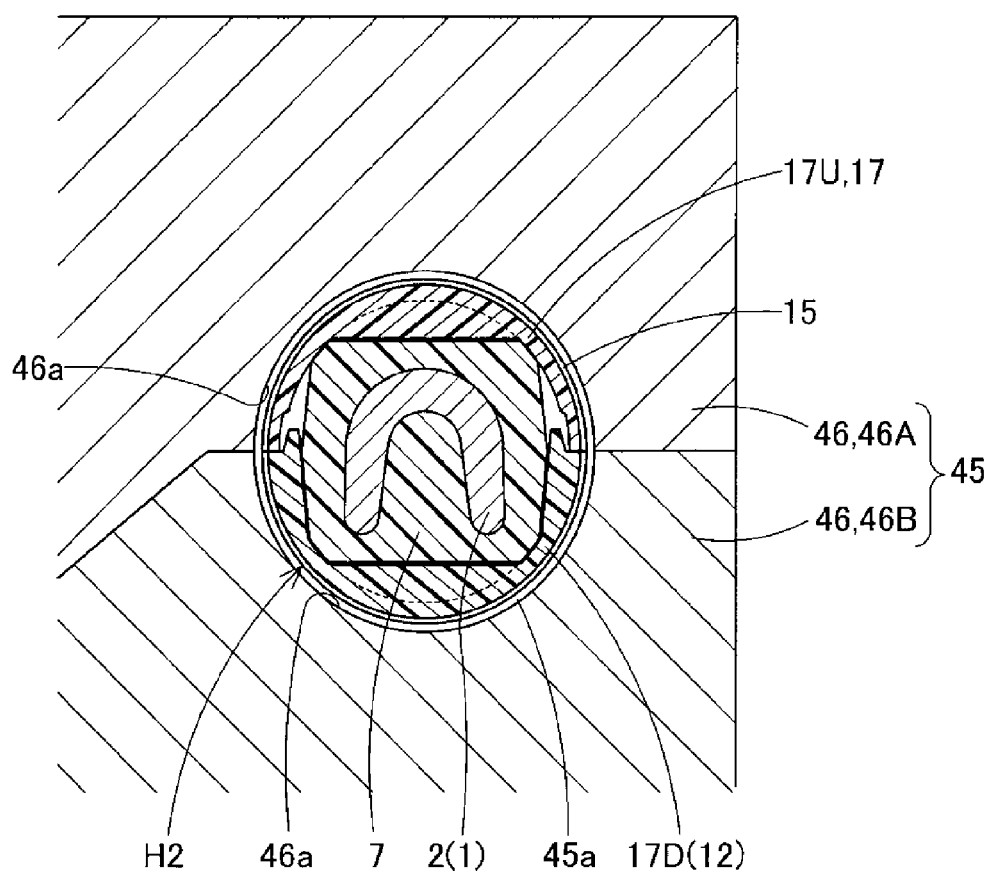
FIG. 12 is a schematic longitudinally sectional view illustrating a molding tool configured to form the clear layer of the illustrative embodiment, which shows a section in the vicinity of a formed part of a decorative part.
Figure 13A:
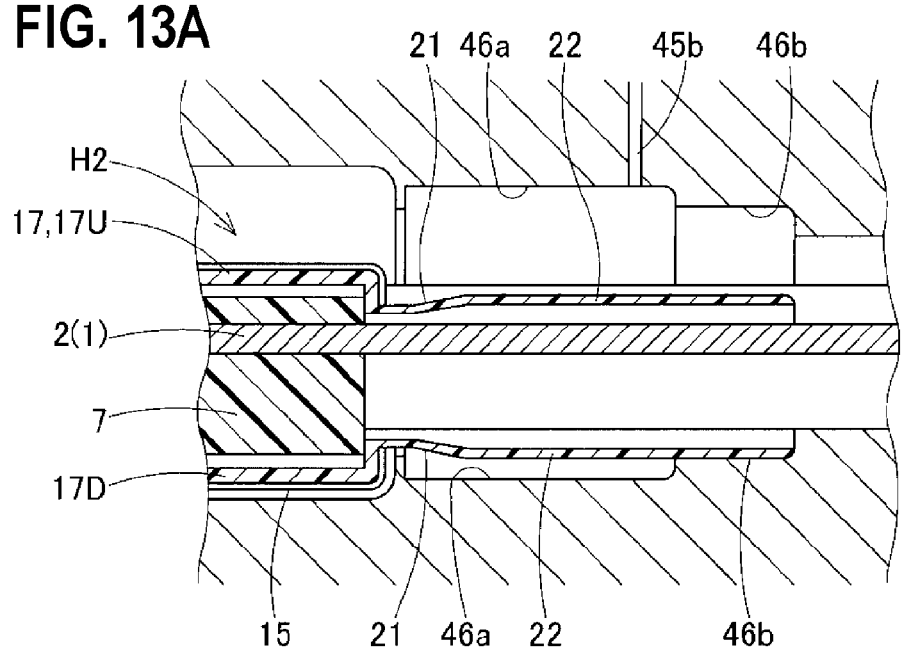
FIGS. 13A and 13B are schematic longitudinally sectional views illustrating the molding tool configured to form the clear layer of the illustrative embodiment, which shows a section along a circumferential direction of a ring part in the vicinity of a front end of the ring part.
Figure 13B:
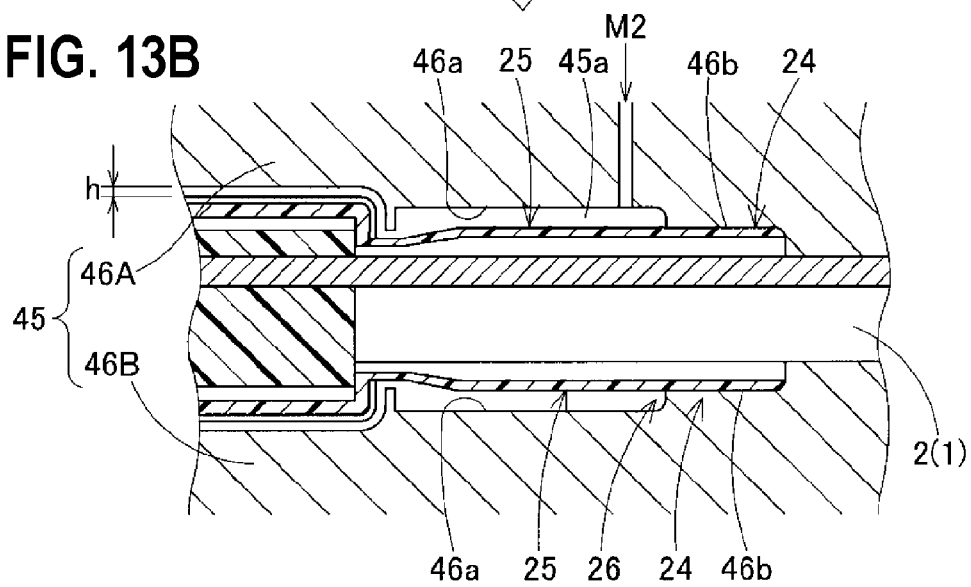
Figure 14A:
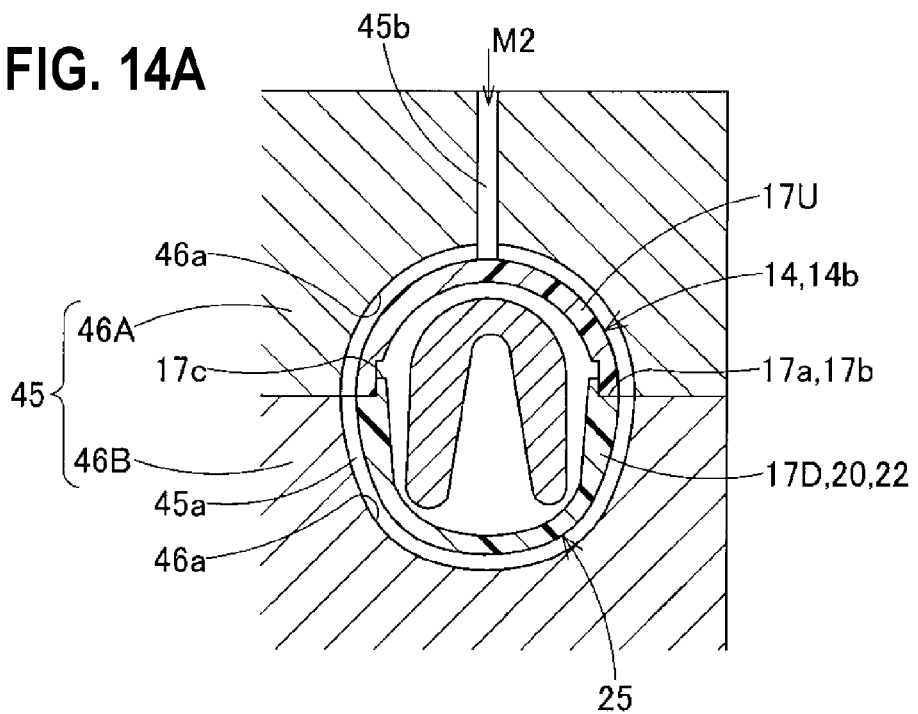
FIGS. 14A and 14B are schematic longitudinally sectional views illustrating the molding tool configured to form the clear layer of the illustrative embodiment, which shows a section of a formed part of an extension part and an exposed part having no clear layer.
Figure 14B:
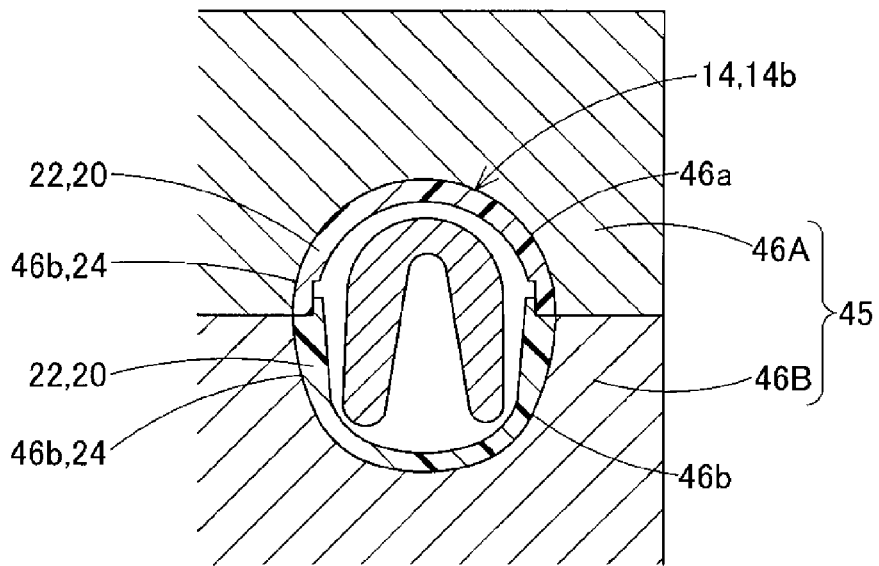

The reaction injection molding tool 45 configured to form the clear layer 28 has the pair of metallic split molds 46 (46A, 46B) made of a steel material and the like, as shown in FIGS. 12 to 14, and a cavity 45a capable of forming the clear layer 28 upon the mold clamping, as shown in FIGS. 12, 13B and 14A, and a gate 45b for injecting the molding material M2 (a transparent urethane material) for forming the clear layer 28 via a defined mixing head is arranged in the cavity 45a. In the split molds 46A, 46B, support surfaces 46b adjacent to mold surfaces 46a for a cavity and capable of interposing and supporting the outer peripheries of the exposed parts 24L, 24R of the small diameter parts 14L, 14R are arranged.

In the meantime, a gap h is arranged around the decoration layer 15 so that the thin decoration main body part 28 of the clear layer 28 can be formed, when setting and clamping the second steering wheel H2 before completion to the opened molding tool 45. In the illustrative embodiment, a thickness t0 of the decoration main body part 29 is 0.7 mm.

A manufacturing process of the leather-wrapped steering wheel W is described. First, the steering wheel core bar 1 is prepared. The steering wheel core bar 1 is set and clamped to the opened molding tool 40 (refer to FIG. 9) for injection molding configured to form the spacer 7 by fitting the boss 4a with the set pin 41b, for example. The molding material M1 is injected into the cavity 40a from the defined gate 40b to thus form the spacer 7. As a result, the first steering wheel H1 before completion as shown in FIG. 7 is manufactured.

Then, the split members 17U, 17D having the decoration layer 15 bonded on the outer surface of the large diameter configuration part 18 are arranged at the upper and lower of the spacer 7 of the first steering wheel H1 before completion, the mating surfaces 17a, 17b are bonded to each other using the adhesive, and the decorative cover 10 is arranged around the ring core bar part 2 with the spacer 7 being interposed, so that the second steering wheel H2 before completion as shown in FIG. 10 is manufactured.

Figure 11:
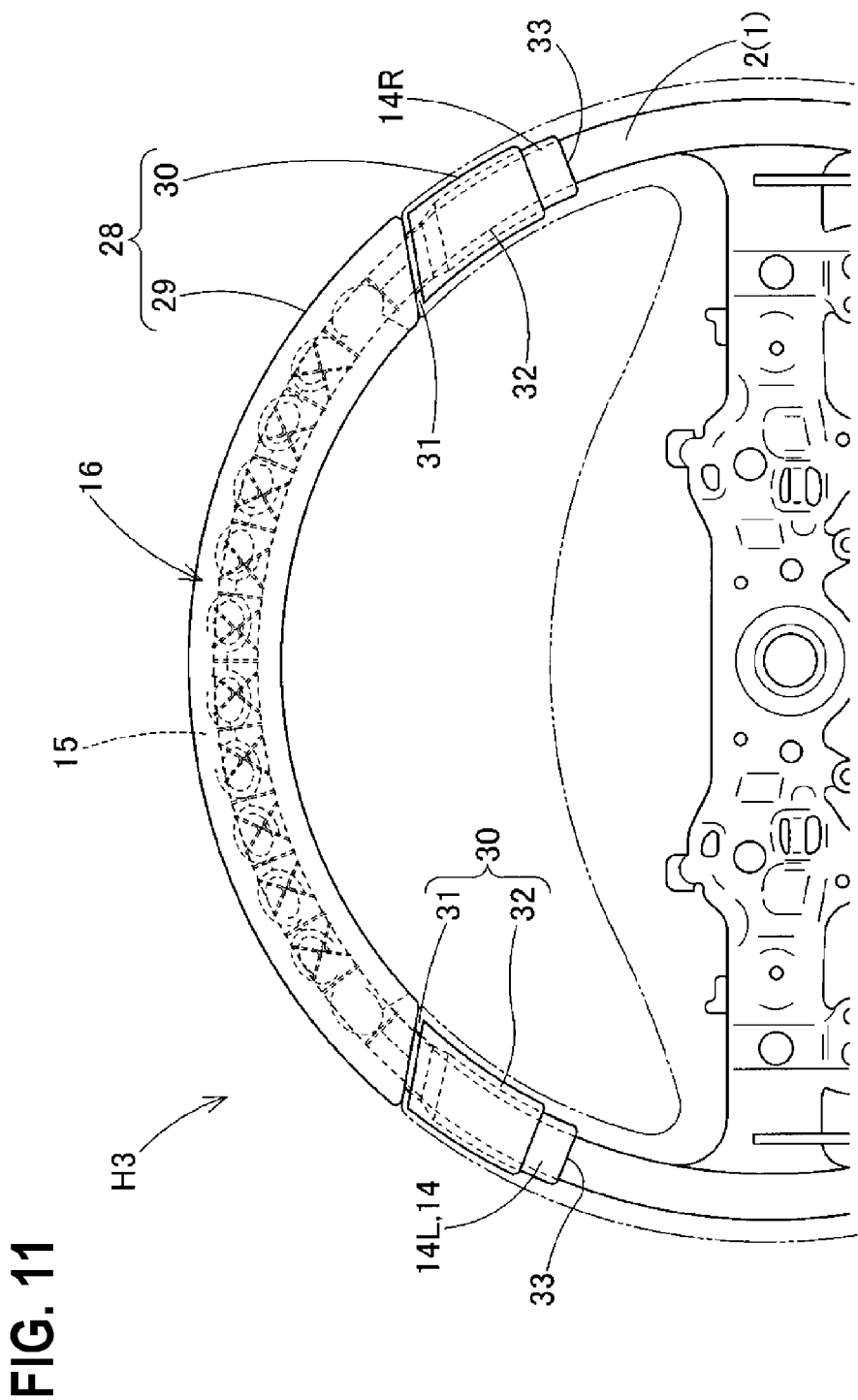
FIG. 11 is a partial plan view illustrating a third steering wheel before completion at a state where a clear layer is formed on the steering wheel of the illustrative embodiment.

After that, the second steering wheel H2 before completion is set and clamped to the opened molding tool 45 (refer to FIGS. 12 to 14) for reaction injection molding configured to form the clear layer 28 by fitting the boss 4a with the defined set pin, for example. The molding material M2 is injected into the cavity 45a from the defined gate 45b to thus form the clear layer 28. As a result, a third steering wheel H3 before completion as shown in FIG. 11 is manufactured.

Thereafter, the covering layer 38 consisting of soft foamed urethane is formed around the ring core bar part 2 of the rear part RB of the ring part R and the spoke core bar part 3 in the vicinity of the ring part R, the leather part 36 is wrapped on the outer surface of the covering layer 38 by using the adhesive, the left and right end portions 36a of the front end-side of the leather part are supported to the support parts 32 of the extension parts 30, and the terminals 36b are fitted in the fitting recesses 31 of the extension parts 30 by using the adhesive, so that the leather-wrapped steering wheel W can be manufactured. In the meantime, when forming the covering layer 38, both end portions 33 of the decorative cover 10 are provided with a filler 34 so that the urethane material is not introduced to the ring core bar part 2 and the inner periphery of the decorative cover 10.

In the steering wheel W manufactured as described above, which is a decoration article of the illustrative embodiment, when the split members 17 (17U, 17D) configuring the decorative cover 10 are arranged to cover the ring core bar part 2 with the spacer 7 being interposed therebetween in the sectional circumferential direction of the ring core bar part 2 of the steering wheel core bar 1, the split members form a cylindrical shape body around the ring core bar part 2, as shown in FIGS. 2, 3, 10, 12 and 14. As shown in FIG. 11, the clear layer 28 is formed on the outer surfaces ranging from the large diameter part 12 of the cylindrical decorative cover 10 to the exposed parts 24 (24L, 24R) of the small diameter parts 14 (14L, 14R) via the step parts 13 (13L, 13R). Therefore, as shown in FIGS. 13 and 14, an edge of the exposed part 24 of the small diameter part 24 becomes a parting portion 26 and the exposed part 24 becomes a support part of the clear layer molding tool 45, so that the decorative cover 10 is set in the cavity 45a of the clear layer molding tool 45 with good precision as regards an arrangement position. Also, in the cavity 45a of the molding tool 45, the part ranging from the large diameter part 12 of the decorative cover 10 to the small diameter parts 14 via the step parts 13 forms the cylindrical shape body continuing in the sectional circumferential direction of the ring core bar part 2. Therefore, there is no gap through which the molding material M2 of the clear layer 28 is introduced to the ring core bar part 2-side and the molding pressure is not lowered upon the molding, so that an air bubble is not generated and the clear layer 28 can be cleanly formed.

Also, since the exposed parts 24 are covered by the cover member 35, the design characteristic of the steering wheel W, which is a decoration article, is not deteriorated even when the clear layer 28 to be formed is not provided.

Since the clear layer 28 can be formed by the mold forming (the reaction injection molding, in this illustrative embodiment), which is different from a dip method and a spraying method requiring a masking and does not require a troublesome operation of performing the masking and detaching a masking material, it is possible to make the film thickness uniform without taking much labor. Therefore, the decoration layer 15 having the wood design is covered by the decoration main body part 29 having the film thickness of the clear layer 28 and is thus glossy, so that it is possible to form a clean decoration part 16 of a high quality, i.e., a gorgeous decoration part 16.

Therefore, in the steering wheel W, which is a decoration article having the clear layer 28 of the illustrative embodiment, it is possible to form the clear layer 28 conveniently and cleanly by using the step parts 13a and the small diameter parts 14 continuing from the large diameter part 12 of the decorative cover 10.

In other words, according to the forming method of the illustrative embodiment, when the split members 17 are arranged around the ring core bar part 2 to thus form the cylindrical decorative cover 10, it is possible to set the decorative cover 10 in the opened clear layer molding tool 45 by using the exposed parts 24 of the small diameter parts 14 of the decorative cover 10 as the support part. Therefore, it is possible to arrange the decorative cover 10 covering the ring core bar part 2 in the cavity 45a with good positional precision and to form the decoration main body part 29 of the clear layer 28 with the uniform thickness even when the decoration main body part 29 of the clear layer 28 to be formed is made to be thin.

Since the clear layer 28 is formed on the outer periphery of the cylindrical shape body having no introduction hole capable of securing the air tightness, i.e., the continuous cylindrical shape body around the ring core bar part 2 from the large diameter part 12 including the decoration layer 15 to the exposed parts 24 of the small diameter parts 14 via the step parts 13, it is possible to prevent the molding material M2 from being introduced to the ring core bar part 2 to lower the molding pressure, and to form the clear layer 28 conveniently and cleanly by the mold forming (the reaction injection molding, in this illustrative embodiment) without generating the air bubbles.

Therefore, according to the forming method of the illustrative embodiment, it is possible to form the decoration main body part 29 of the clear layer 28 provided for the steering wheel W as a decoration article conveniently and cleanly by using the step parts 13 and the small diameter parts 14 continuing from the large diameter part 12 of the decorative cover 10.

Also, according to the steering wheel W of the illustrative embodiment, the spacer 7 capable of supporting the decorative cover 10 with contacting the ring core bar part 2 and the decorative cover 10 is arranged between the large diameter part 12 of the decorative cover 10 and the ring core bar part 2.

For this reason, according to the illustrative embodiment, even when the large diameter part 12 of the decorative cover 10 is arranged with being separate from the outer periphery of the ring core bar part 2 of the steering wheel W, the large diameter part 12 can be supported to the ring core bar part 2 with the spacer 7 being interposed therebetween. Therefore, it is possible to prevent the positional deviation (shaking) or depression of the decorative cover 10 (the large diameter part 12) with respect to the ring core bar part 2.

According to the forming method of the illustrative embodiment, the spacer 7 is arranged around the ring core bar part 2 by the mold forming, rather than a method of separately mounting the spacer 7 to the ring core bar part 2. Therefore, it is possible to easily arrange the spacer 7 around the ring core bar part 2.

In the illustrative embodiment, the ring core bar part 2 continuing in the circular ring shape as a rod shape of the ring part R gripped upon the steering of the vehicular steering wheel W is formed as the core material, and the decorative cover 10 having the decoration layer 15 as a wood design and the cover member 35 having the leather part 36 provided on the outer surface thereof are arranged along the circumferential direction of the plane of the ring part R, so that the leather-wrapped steering wheel W is configured as an example of the decoration article.

According to the illustrative embodiment of the leather-wrapped steering wheel W as the decoration article, the extension part 30 having the support part 32 configured to support the end portion 36a of the leather part 36 and the fitting recess 31 arranged between the support part 32 and the large diameter part 12 and configured to fit the terminal 36b of the leather part 36 therein is formed by the mold forming so as to extend the molding material M2 of the clear layer 28.

Therefore, according to the illustrative embodiment, since it is possible to fit the terminal 36b of the leather part 36 in the fitting recess 31, it is possible to cleanly finish the terminal of the leather part 36.

According to the forming method of the illustrative embodiment, since it is possible to form the extension part 30 at the same time upon the forming of the clear layer 28, it is possible to arrange the extension part at the defined position around the ring core bar part 2 without labor and easily, thereby easily manufacturing the leather steering wheel W.

Figure 15:
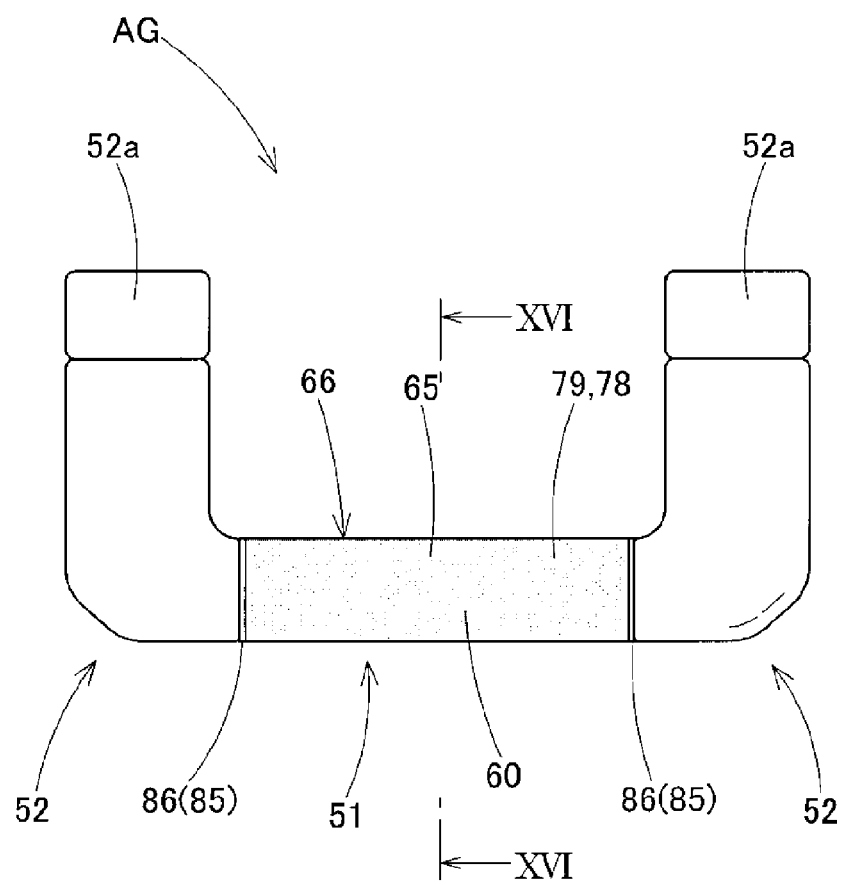
FIG. 15 is a front view illustrating a decoration article according to another illustrative embodiment.
Figure 16:
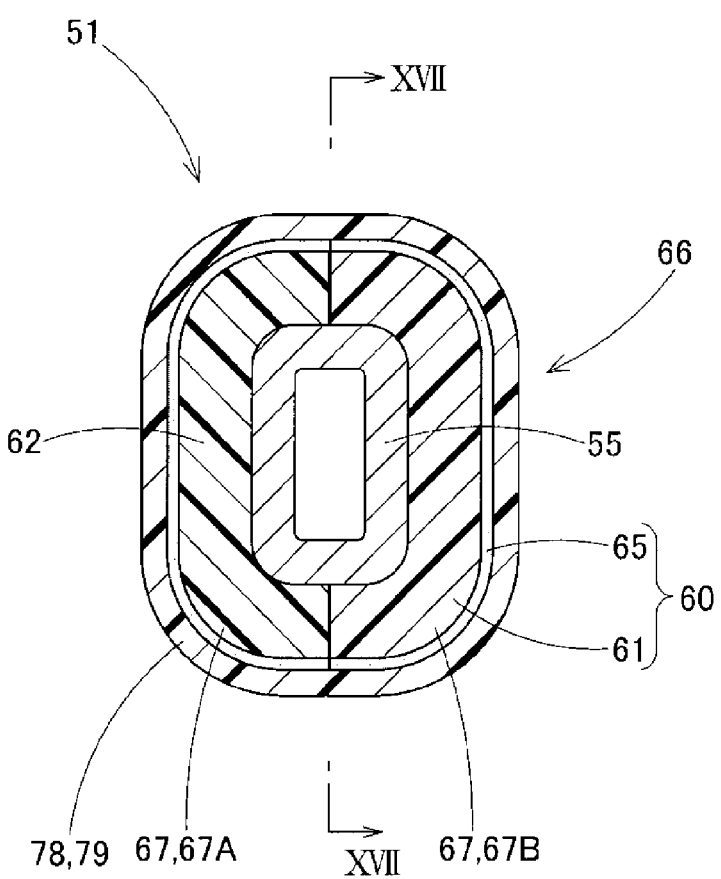
FIG. 16 is a schematic longitudinally sectional view of the decoration article shown in FIG. 15, which is taken along a line XVI-XVI of FIG. 15.
Figure 17:
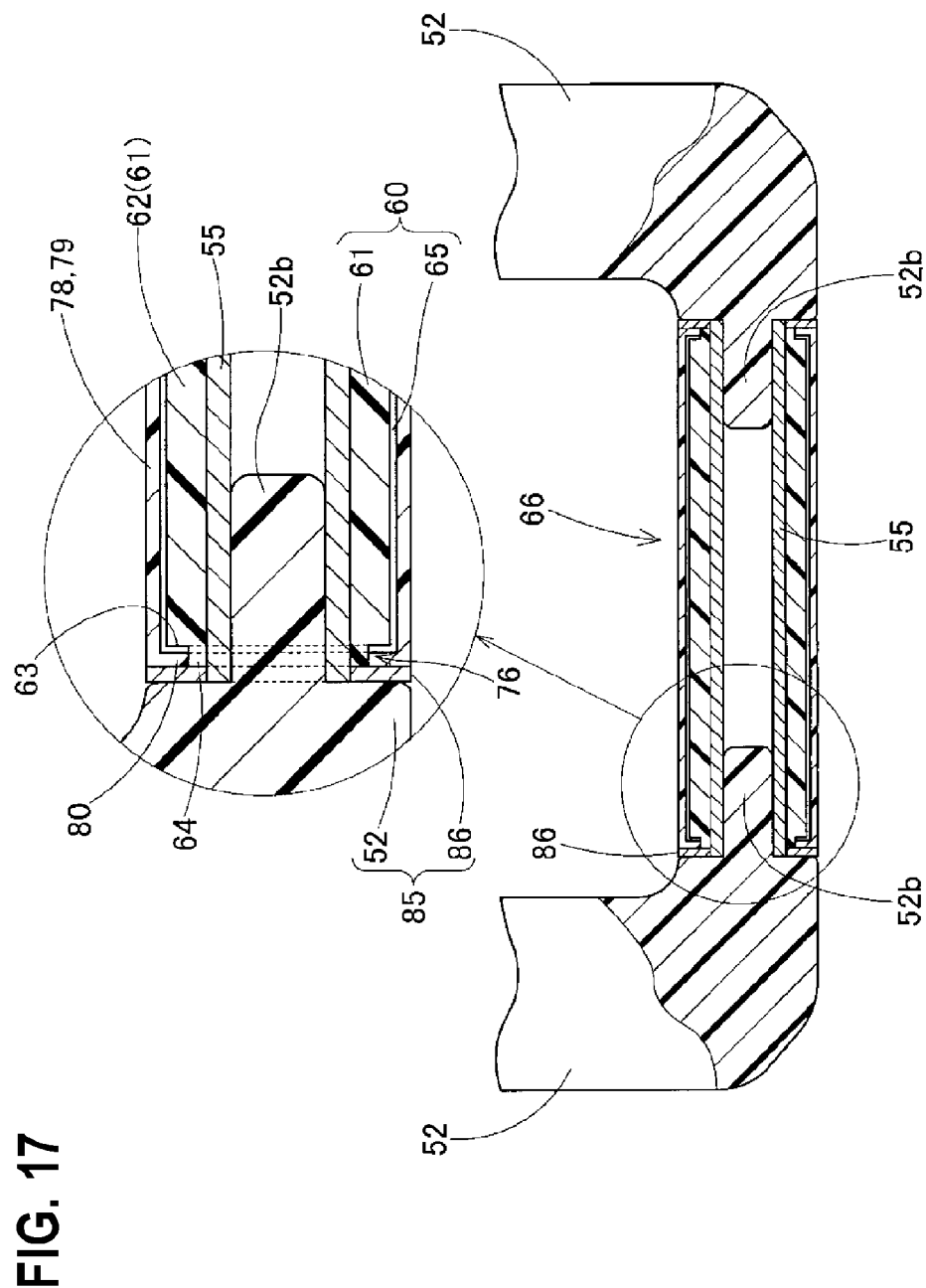
FIG. 17 is a schematic longitudinally sectional view of the decoration article shown in FIG. 15, which is taken along a line XVII-XVII of FIG. 16.

Also, according to the illustrative embodiment, the leather-wrapped steering wheel W has been exemplified as the decoration article. However, the present invention is not limited to the steering wheel W and may be applied to any article having a clear layer that is formed by the mold forming. For example, as shown in FIGS. 15 to 17, the decoration article may be an assist grip AG having a clear layer 78, which is formed by the mold forming and is made of transparent urethane, provided on an outer surface of a gripping part 51.

The assist grip AG has a U shape, includes the gripping part 51 and two arm parts 52 extending from both ends of the gripping part 51. Tips of the arm parts 52 are provided with attachment parts 52a that can be attached to a body such as a roof side rail in a vehicle interior.

The gripping part 51 has a core material 55 made of metal or rigid synthetic resin and having a quadrilateral pipe shape and stiffness, a decorative cover 60 having a quadrilateral pipe shape and configured to surround the core material 55, the clear layer 78 configured to cover an outer surface of the decorative cover 60 and cover members 85 arranged around small diameter parts 64 at both ends of the decorative cover 60. The decorative cover 60 has a base part 61 made of rigid synthetic resin such as polypropylene and a sheet material (decoration layer) 65 bonded to an outer surface of a large diameter part 62 of the base part 61 and expressing a wood design.

The base part 61 has the large diameter part 62 having a thick quadrilateral annular section, step parts 63, 63 configured to come close to the core material 55 at left and right ends of the large diameter part 62, and the small diameter parts 64, 64 continuing from the step parts 63, extending from the large diameter part 62 and having a thin quadrilateral annular section. The decoration layer 65 is arranged on the outer surface of the large diameter part 62.

The decorative cover 60 has two split members 67 (67A, 67B). When the split members 67A, 67B are bonded to each other, the quadrilateral cylindrical shape body continuing in a sectional circumferential direction of the core material 55 can be formed.

The clear layer 78 has a decoration main body part 79 configured to cover an outer periphery of the decoration layer 65 of the large diameter part 62 and extension parts 80 configured to cover outer peripheries of the small diameter parts 64 via the step parts 63. The extension parts 80 are configured to cover the small diameter parts 64, 64 having exposed parts 74 without covering terminals of the small diameter parts 64, 64 (refer to FIG. 17).

The cover member 85 has glossy metal rings 86 having a quadrilateral annular shape and fitted between the small diameter parts 64 and the arm parts 52 at the periphery of the small diameter parts 64, and the arm parts 52, 52 extending from both sides of the gripping part 51. The arm parts 52, 52 are configured to fit and bond fitting portions 52b at the end portions of the gripping part 51 to the core material 55, thereby configuring the cover member 85 configured to cover the peripheries and terminals of the small diameter parts 64, together with the metal rings 86.

Also in the assist grip AG, when the split members 67 configuring the decorative cover 60 are arranged to cover the core material 55 in the sectional circumferential direction of the core material 55, the split members form a cylindrical shape body around the core material 55. The clear layer 78 is formed on the outer surfaces ranging from the large diameter part 62 to the exposed parts 74 of the small diameter parts 64 via the step parts 63. Therefore, an edge of the exposed part 74 of the small diameter part 64 becomes a parting portion 76 and the exposed part 74 becomes a support part of a clear layer molding tool, so that the decorative cover 60 can be set in a cavity of the clear layer molding tool with good precision as regards the arrangement position. Also, in the cavity of the molding tool, the part from the large diameter part 62 of the decorative cover 60 to the small diameter parts 64 via the step parts 63 forms the cylindrical shape body continuing in the sectional circumferential direction of the core material. Therefore, there is no gap through which the molding material of the clear layer 78 is introduced to the core material 55-side, and the molding pressure is not lowered upon the molding, so that an air bubble is not generated and the clear layer 78 can be cleanly formed.

Also, since the exposed parts 74 are covered by the cover member 85, the design characteristic of the assist grip AG, which is a decoration article, is not deteriorated even when the clear layer 78 is not provided.

Since the clear layer 78 can be formed by the mold forming, which is different from a dip method and a spraying method requiring a masking and does not require a troublesome operation of performing the masking and detaching a masking material, it is possible to make the film thickness uniform without taking much labor. Therefore, a clean decoration part 66 of a high quality can be formed and the similar operational effects to the above-described illustrative embodiment can be accomplished.

Meanwhile, the assist grip AG can be manufactured by forming the clear layer 78, fitting the metal rings 86, 86 around the small diameter parts 64, 64, and bonding and fitting the fitting portions 52b of the arm parts 52, 52 into the core material 55 of the gripping part 51.

What is claimed is:

1. A decoration article having a clear layer, comprising:
    a rod-shaped core material;
    a cylindrical decorative cover having a shape retaining property, configured to cover the core material over an entire circumference in a sectional circumferential direction of the core material, including a plurality of split members split along the sectional circumferential direction of the core material and having a base part and a decoration layer provided on a surface of the base part, and
    a transparent clear layer formed by a mold forming so as to cover an outer surface of the decoration layer over an entire circumference in a sectional circumferential direction of the decoration cover covering the core material,
    wherein the base part of the decorative cover includes a large diameter part having the decoration layer and covered with the clear layer, step parts configured to come closer to the core material from both ends of the large diameter part than the large diameter part, and small diameter parts extending from inner periphery edges of the step parts so as to be separate from the large diameter part,
    wherein the respective split members are configured to form a mutually continuing cylindrical shape body around the core material when the split members are arranged around the core material,
    wherein the clear layer is arranged to leave exposed parts over entire circumferences of both terminals of the small diameter parts and to cover an outer periphery ranging from the large diameter part including the decoration layer to the small diameter parts via the step parts, and
    wherein a cover member adjacent to the decoration layer and configured to cover the small diameter parts is arranged at both ends of the decorative cover.

2. The decoration article according to claim 1, wherein a spacer configured to support the decorative cover with contacting the core material and the decorative cover is arranged between the large diameter part of the decorative cover and the core material.

3. The decoration article according to claim 1, wherein the core material is a core material having a continuous circular-ring shape configured as a rod shape of a ring part gripped upon steering of a vehicular steering wheel,
    wherein the ring part is arranged with the decorative cover having the decoration layer as a wood design and the cover member having a leather part provided on an outer surface thereof, in a circumferential direction of a plane thereof, and
    wherein the decoration article is configured as a leather-wrapped steering wheel.

4. The decoration article according to claim 3, wherein extension parts including a support part configured to support an end portion of the leather part and a fitting recess arranged between the support part and the large diameter part and configured to fit a terminal of the leather part therein are formed on outer surfaces of the small diameter parts of the decorative cover so as to extend a molding material of the clear layer by a mold forming.

5. A method of forming a decoration article having a clear layer, the decoration article comprising:
    a rod-shaped core material;
    a cylindrical decorative cover having a shape retaining property, configured to cover the core material over an entire circumference in a sectional circumferential direction of the core material, including a plurality of split members split along the sectional circumferential direction of the core material and having a base part and a decoration layer provided on a surface of the base part, and
    a transparent clear layer formed by a mold forming so as to cover an outer surface of the decoration layer over an entire circumference in a sectional circumferential direction of the decoration cover covering the core material,
    wherein the base part of the decorative cover including a large diameter part having the decoration layer and covered with the clear layer, step parts configured to come closer to the core material from both ends of the large diameter part than the large diameter part, and small diameter parts extending from inner periphery edges of the step parts so as to be separate from the large diameter part,
    wherein the respective split members are configured to form a mutually continuing cylindrical shape body around the core material when the split members are arranged around the core material,
    wherein the clear layer is arranged to leave exposed parts over entire circumferences of both terminals of the small diameter parts and to cover an outer periphery ranging from the large diameter part including the decoration layer to the small diameter parts via the step parts, and wherein a cover member adjacent to the decoration layer and configured to cover the small diameter parts is arranged at both ends of the decorative cover, the method comprising:

arranging the respective split members of the decorative cover around the core material, setting the core material having the split members arranged thereto in an opened clear layer molding tool by using the exposed parts of the small diameter parts as a support part, and closing the tool to form the clear layer.

6. The method according to claim 5, further comprising setting a spacer in the clear layer molding tool, the spacer made of synthetic resin, configured to support the decorative cover with contacting the core material and the decorative cover and arranged between the large diameter part of the decorative cover and the core material, wherein the spacer is formed around the core material by a mold forming.

7. The method according to claim 5 wherein the core material is a core material having a continuous circular-ring shape configured as a rod shape of a ring part gripped upon steering of a vehicular steering wheel, wherein the ring part is arranged with the decorative cover having the decoration layer as a wood design and the cover member having a leather part provided on an outer surface thereof, in a circumferential direction of a plane thereof, and wherein the decoration article is configured as a leather-wrapped steering wheel.

8. The method according to claim 7, further comprising forming extension parts together with the clear layer upon the forming of the clear layer molding tool, the extension parts including a support part configured to support an end portion of the leather part and a fitting recess arranged between the support part and the large diameter part and configured to fit a terminal of the leather part therein are formed on outer surfaces of the small diameter parts of the decorative cover so as to extend a molding material of the clear layer by a mold forming.

* * * * *